April 12, 1938.   N. E. JERSEY   2,113,917
EARTH WORKING TOOL
Filed Jan. 27, 1937   5 Sheets-Sheet 1
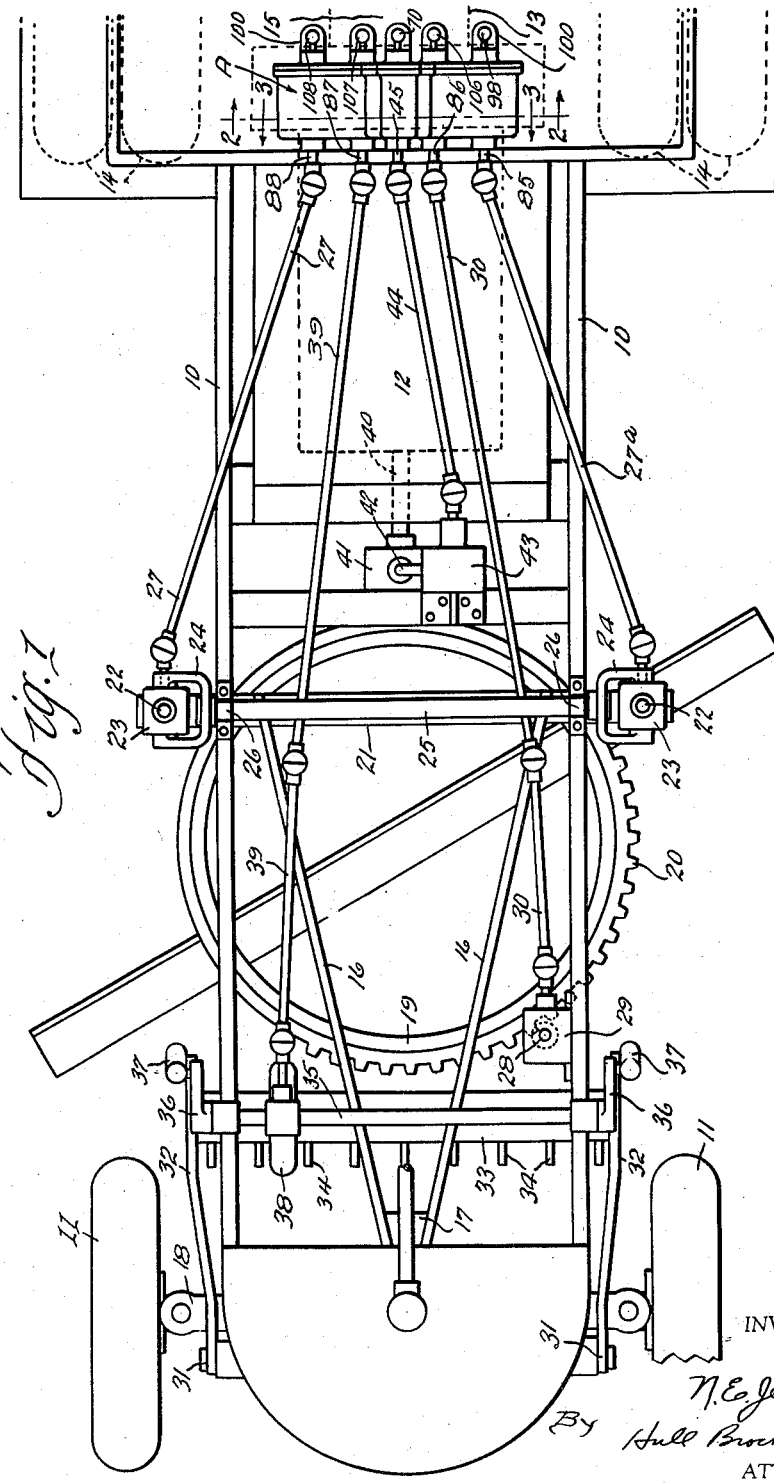
INVENTOR.
N. E. Jersey
By Hull Brock & West
ATTORNEY.

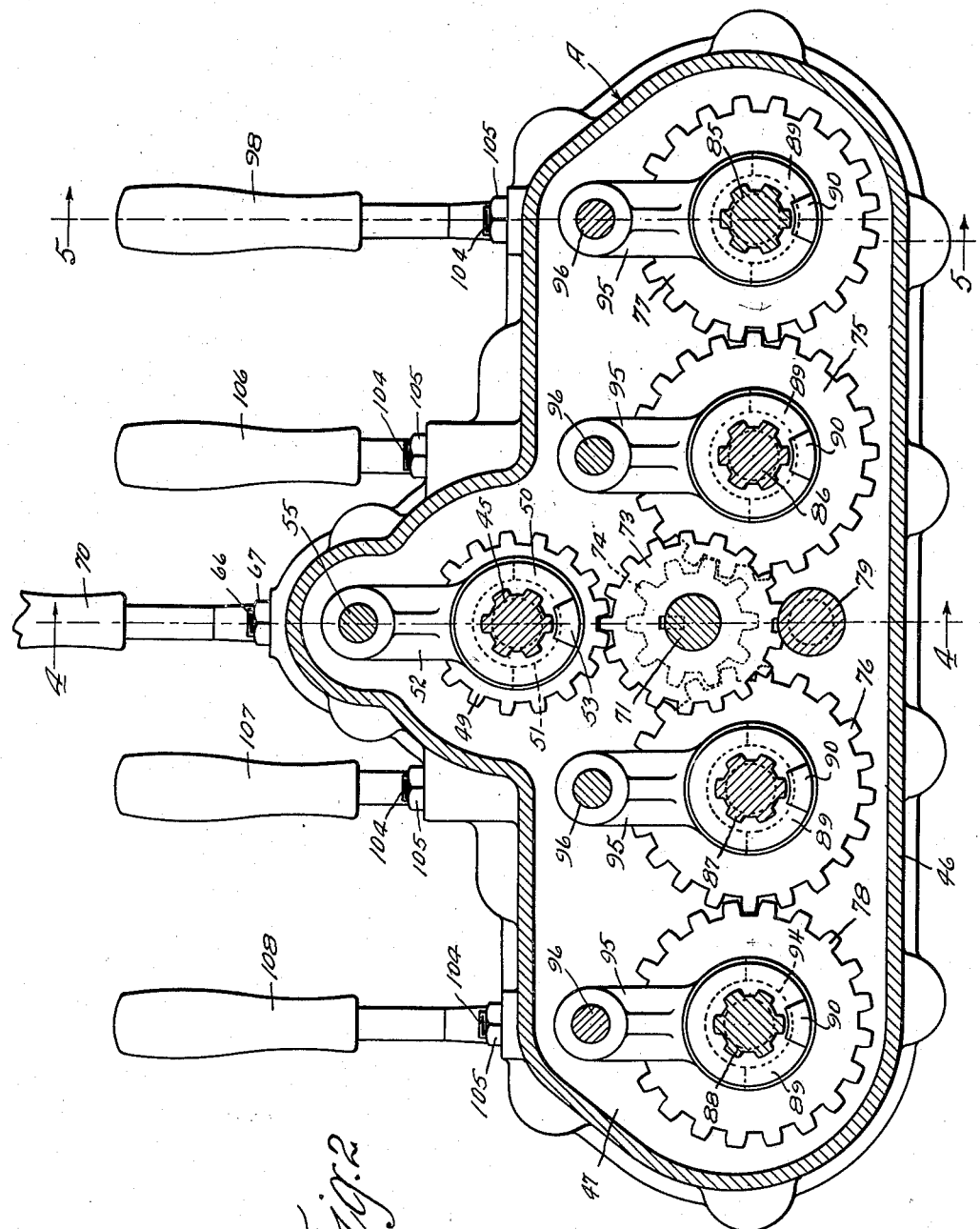

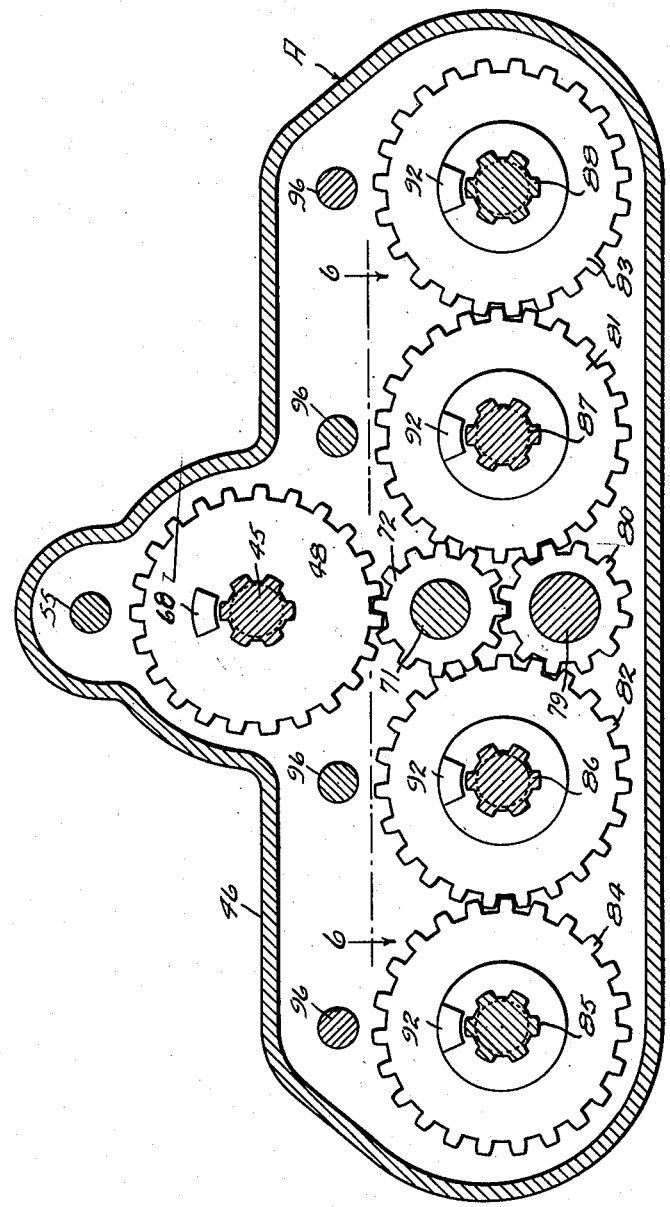

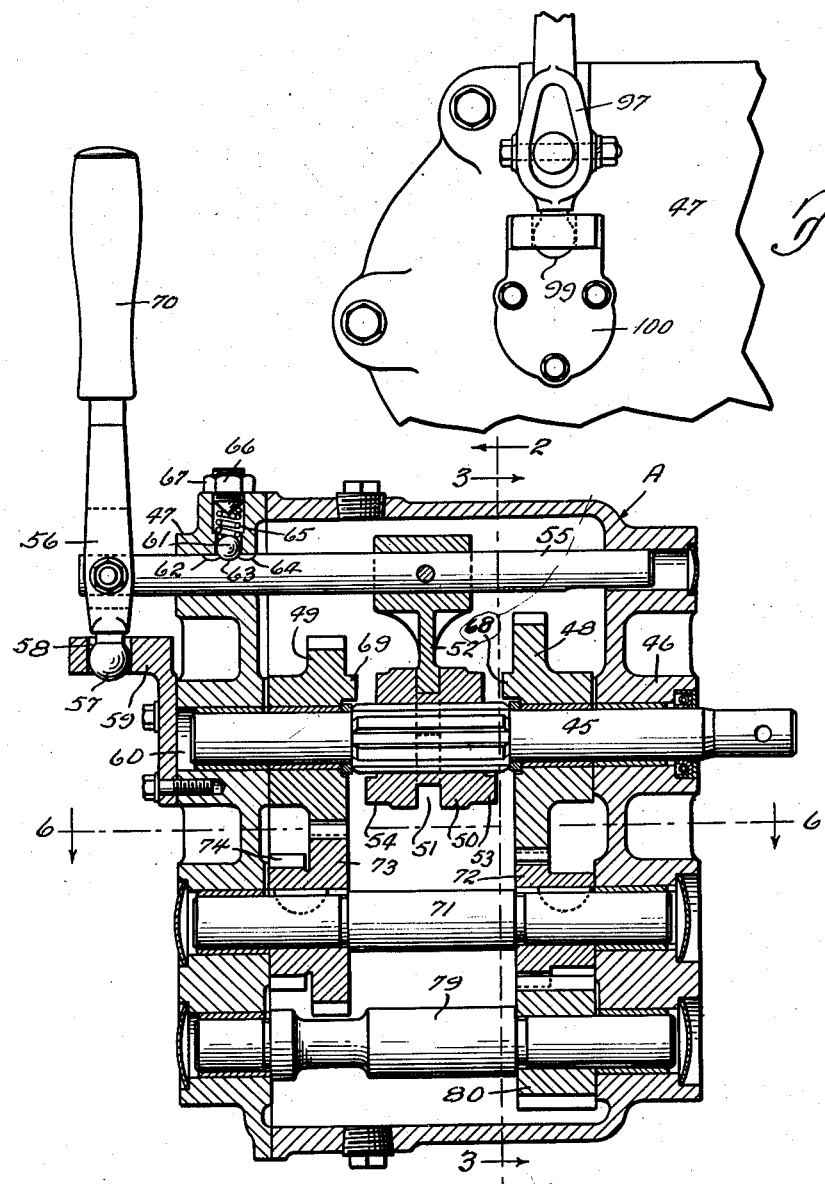

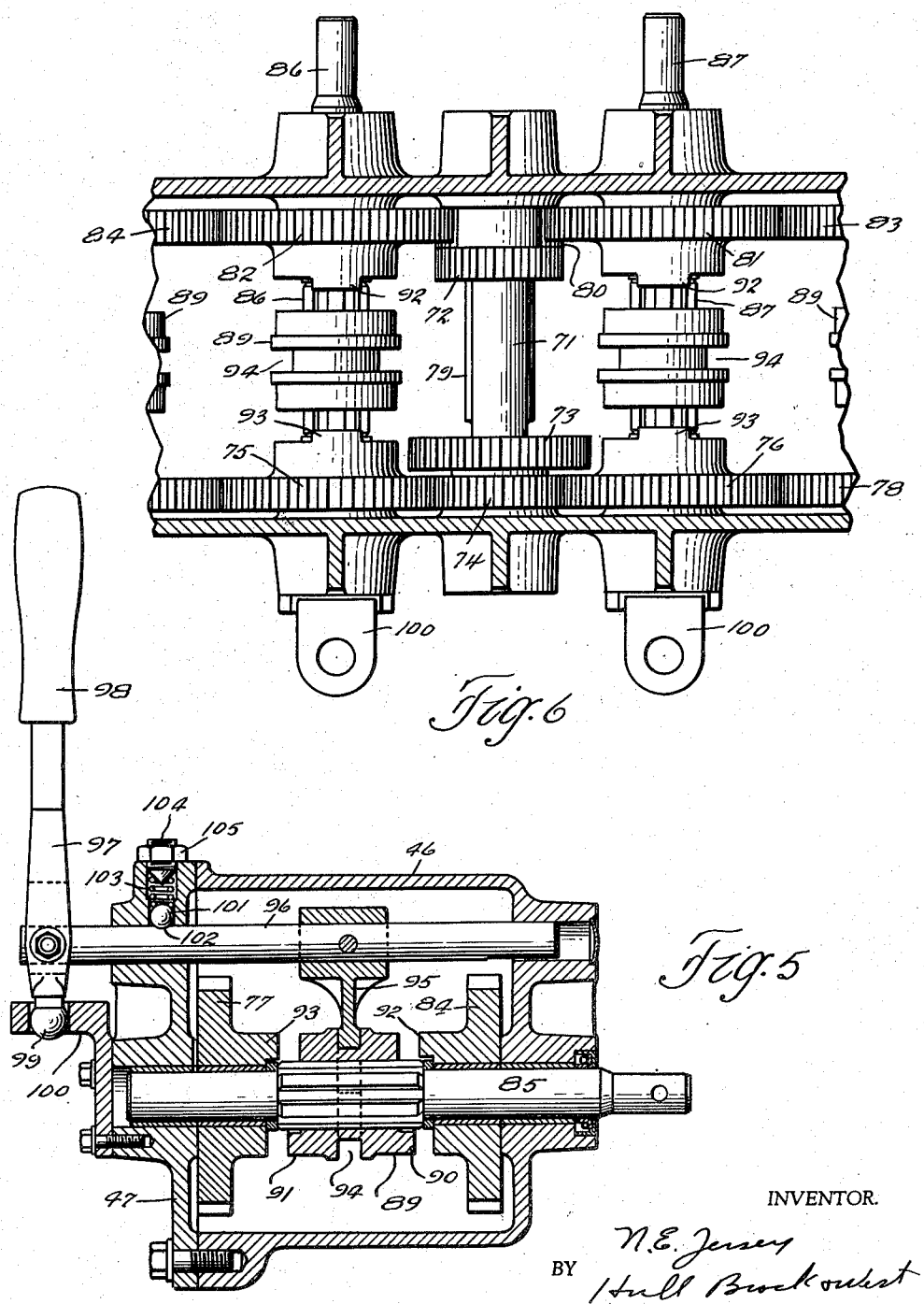

Patented Apr. 12, 1938

2,113,917

UNITED STATES PATENT OFFICE 2,113,917

EARTH WORKING TOOL

Neil E. Jersey, Bucyrus, Ohio, assignor to W. A. Riddell Corporation, Bucyrus, Ohio, a corporation of Ohio Application January 27, 1937, Serial No. 122,619

6 Claims. (Cl. 37—156)

This invention relates to an earth-working tool and has particular reference to such a tool provided with power operated adjusting or control means for the earth engaging elements such as scraper blade, scarifier or the like.

An object of the invention is to provide a tool of the character indicated wherein simple and efficient power transmission means is provided for operating the tool adjustments or controls in either direction and selectively at different speeds. The most obvious source of power for use in a self-propelled earth working tool of the type indicated is a suitable takeoff from the power plant which propels the device. This may be either on the motor side or on the traction element side of the vehicle transmission. If connected in advance of the transmission, the drive will be subject to speed variations of the motor itself according to load or the selected gear ratio between the power plant and the traction elements. If the takeoff is behind the transmission, the velocity of the power source tool control will vary according to whether the transmission is set for high, low or intermediate speed. While I prefer to have the power takeoff in advance of the transmission, in either case it is desirable to provide a change speed gearing between the source of power and the tool controls whereby to compensate for the differences in speed of the power source. The change speed mechanism is also desirable for the purpose of enabling the operator to select a faster or slower rate of tool control operation depending upon the nature of the tool control itself, the amount of change desired and the working conditions and without the necessity of changing the motor speed.

A further object is to provide a device capable of attaining the above object and in which a simple and efficient reverse gearing is introduced in series with the change speed gearing between the power takeoff and the tool controls, a reverse gearing being provided for each tool control.

A still further object is to provide a novel transmission combining in a unitary structure the change speed and reverse gearing above referred to and providing simple and highly convenient controls for realizing the selective features of the device and which will be conveniently positioned for easy access by an operator at the operator's station.

Other and more limited objects will be in part apparent and in part pointed out hereinafter in connection with the accompanying drawings wherein Fig. 1 is a schematic fragmentary plan view of a self-propelled road working vehicle embodying the invention; Figs. 2 and 3 are sections corresponding substantially to the lines 2—2 and 3—3 of Fig. 1, also to the lines 2—2 and 3—3 of Fig. 4; Fig. 4 is a section corresponding substantially to the line 4—4 of Fig. 2; Fig. 5 is a section on the line 5—5 of Fig. 2; Fig. 6 is a section corresponding substantially to the line 6—6 of Fig. 3 and also to the line 6—6 of Fig. 4; and Fig. 7 is a fragmentary elevational view looking from left to right in Fig. 5.

Referring first to Fig. 1, the numeral 10 indicates a suitable framework of a motor operated earth-working tool provided with the usual steerable front wheels 11, a motor 12, transmission 13, traction elements 14 and operator's station 15.

Carried by the frame 10 centrally thereof is a scraper attachment comprising radius rods 16 secured at their forward ends to a block 17 which is inturn pivoted to the frame 10 for rotation about a horizontal axis at a point approximately in line with the front axle 18. The pivot point of the radius rods 16 is not shown on the drawings. The radius rods 16 are connected to a non-rotatable circle element 19 which is concentric with a rotatable circle element 20 and forms a journal or bearing therefor. Connected to the circle member 19 and to the rear ends of the radius rods 16 is a transverse bar 21 to the outer ends of which are universally connected vertically extending shafts 22, the upper ends of which are threaded and received in threaded portions of pivotally mounted blocks 23. The blocks 23 are pivoted in yokes 24 which are supported on the cross rod 25. The cross rod 25 is attached to the frame 10 by suitable bearings 26. The blocks 23 are provided internally with gear elements, not shown, a driven one of which is threaded on the shafts 22 and a driving one of which is carried by a shaft 27 which extends to the control box A positioned at the operator's station 15. The shaft 27 is provided with suitable universal joints to take care of its change in direction.

The outer circle element 20 is provided with gear teeth which mesh with a pinion, not shown, which is mounted in fixed relation to the inner circle member 19 on a suitable bracket (not shown). The said pinion is carried by a shaft 28 which comprises telescoping portions so related to each other as to allow extension in length but to prevent rotation of the two parts with respect to each other. This shaft is also provided with suitable universal joints and the upper end of the upper portion is threaded and carries a worm gear housed in a gear box 29. A worm meshes with the said worm gear and is carried by the shaft 30 which extends through suitable universal joints to the control box A.

Pivoted to the framework as indicated at 31 are links 32 which extend rearwardly and downwardly and carry at their lower ends a scarifier head 33 to which are secured suitable teeth 34. Rotatably mounted on the frame 10 is a shaft 35 provided with crank arms 36 at its ends. Suitable links 37 connect the arms 36 with the lower ends of the links 32 so that by rotation of the shaft 35 the scarifier is raised and lowered. Mounted on the shaft 35 is a worm gear housed in a casing 38 which casing journals a worm carried by a shaft 39 extending to the control box A.

Obviously, other tool controls may be provided and other control shafts for operating the same may be suitably driven from the control box A, the construction of which will be described in detail hereinafter. In actual practice, the device illustrated in Fig. 1 is provided with a further control for determining the lateral position of the circle, such control being applied to a laterally extending thrust member connected between the frame and the circle.

As will be apparent from Fig. 1 the device shown has the power plant and traction elements located at the rear. In actual practice a control box according to the invention has been applied to a device of this kind and the power takeoff was from the front end of the crank shaft 40, as indicated in Fig. 1. A suitable gear box 41 encloses a gear which meshes with a pinion carried by the crank shaft 40. Such gear rotates an upwardly extending shaft 42 which in turn transmits power through a gear box 43 to a power shaft 44.

Referring now to Figs. 2–7 inclusive, the control box A will be described. The power shaft 44 is connected to a drive shaft 45 which is journaled in suitable bearings in the casing elements 46 and 47. Journaled on the shaft 45 for free rotation are high and low speed gears 48 and 49, respectively. Splined on the shaft 45 for reciprocating motion is a selector 50 in the nature of a collar provided centrally with a groove 51 adapted to receive an operating yoke 52 and carrying clutch elements 53 and 54 on the two faces thereof. The motion of the operating yoke 52 is controlled by a reciprocating rod 55 which is slidably mounted in the housing elements 46 and 47. At one end of the shaft 55 the same is pivoted to a lever 56 which is provided at its lower end with a spherical portion 57 received in a cylindrical bore 58 in a bracket 59. The bracket 59 also provides a cover for the bore 60 which receives one end of the shaft 45. The shaft 55 is yieldably held either in neutral position or in position to engage the element 50 with one or the other of the gears 48 and 49 by a spring pressed ball 61 received in a selected one of three part spherical depressions 62, 63 and 64 formed in the shaft 55. The ball 61 is yieldably held in place by a spring 65 which is adjustably held in position by a threaded element 66 and lock nut 67. The gears 48 and 49 are provided with clutch elements 68 and 69 which are respectively complementary to the clutch elements 53 and 54 carried by the collar 50. It is obvious from the foregoing that when the shaft 45 is being driven by the vehicle motor that by operation of the handle 70, the shaft 45 may be connected in driving relation to either of the gears 48 and 49 but not to both simultaneously.

Journaled in suitable bearings in the housing members 46 and 47 and spaced from the shaft 45 is a shaft 71 to which are keyed gears 72 and 73 meshing at all times with gears 48 and 49, respectively. Integral with the gear 73 is a smaller gear 74 which is constantly in mesh with the gears 75 and 76. The gears 75 and 76 are in turn constantly in mesh with gears 77 and 78, respectively.

Below the shaft 71 and spaced therefrom is a shaft 79 journaled in the casing elements 46 and 47 and carrying a gear 80. This gear may have a tight fit with the shaft 79 so that it rotates in the journals provided in the casing elements and need not be provided with a separate bushing. It will be noted that the gear 80 is of a thickness about double that of the toothed portion of the gear 72 so that a portion thereof is available without interference with the operation of the gear 72 to mesh with other gears. That portion of the gear 80 which does not coact with the teeth of the gear 72 meshes with the gears 81 and 82 which are of a thickness not to interfere with the gear 72, as best seen in Figs. 2 and 6. The gears 81 and 82 mesh with gears 83 and 84, respectively. It will thus be apparent that there is only a single rotating element consisting of gears 73 and 74 interposed between the low speed gear 49 and the gears 75 and 76, whereas there are two rotating elements, gears 72 and 80, interposed between the high speed gear 48 and the gears 81 and 82. The gears 77 and 84 are both mounted on the shaft 85 and thus constitute a pair, the same is true of the gears 82 and 75 mounted on the shaft 86, the gears 81 and 76 mounted on the shaft 87 and the gears 83 and 78 mounted on the shaft 88. It will thus be clear that the corresponding gears of each pair will rotate in opposite directions.

In Fig. 5, I have shown one reversing gear unit, the construction of which is identical with that of the other three. With the exception of the differences in the showing of the housing, Fig. 5 might be a section taken centrally through any one of the shafts 85, 86, 87 or 88. As will be clear from the drawings, the gears 77 and 84 are free to rotate on the shaft 85.

Splined on the shaft 85 is a collar element 89 which is provided on its two faces with clutch elements 90 and 91 complementary to clutch elements 92 and 93 on the gears 84 and 77, respectively. The collar element 89 is provided with a groove 94 adapted to receive a yoke 95 for the purpose of engaging the collar 89 selectively with the gears 77 and 84 whereby to transmit power from such gears through the shaft 85 to the tool control shaft 27ᵃ. The yoke 95 is carried by a reciprocating shaft 96 which is operated by a lever 97 provided with a handle 98 and a spherical portion 99 received in a cylindrical bore in a bracket 100. The shaft 96 is held in neutral position by a ball 101 yieldably received in a depression 102 and urged into the position shown in Fig. 5 by a spring 103. The spring 103 is adjustably held in position by a threaded element 104 and lock nut 105.

Similar control elements are provided for the gears associated with the shafts 86, 87 and 88 and these elements are operated by handles 106, 107 and 108, respectively. The shafts 86, 87 and 88 are connected to the shafts 30, 39 and 27, respectively.

From the foregoing, it will be obvious that when the control handle 70 for the change speed gearing is in the position shown in Fig. 4, the shaft 45 will rotate idly and all other mechanism in the control box A will be idle, that when the handle 70 is moved to engage either of the gears 48 and 49, all the gears in the control box will rotate, the speed alone being different depending upon which of the gears 48 and 49 is engaged with the power shaft 45. It will also be apparent that when one of the gears 48 and 49 is engaged with the shaft 45, the gears at the opposite ends of the shafts 85, 86, 87 and 88 will rotate in opposite directions and therefore that the shafts 27ᵃ, 30, 39 and 27 will rotate in one or the other direction depending upon which one of the gears of each pair is engaged with the power output shaft and consequently upon the position of the reversing handle corresponding to that shaft.

In order to operate any selected tool control, it will be necessary first to set the handle 70 at the desired speed and then operate the proper handle 98, 106, 107 or 108 in one direction or the other depending upon whether a forward or reverse motion is desired.

While I have shown and described the present preferred embodiment of my invention, I wish it understood that the same may be realized in varying structures and that I am limited only in accordance with the appended claims and the prior art.

Having thus described my invention, what I claim is:

1. In an earth working tool, in combination with a plurality of tool adjusting devices to be operated, means for operating such devices, reversing gear mechanism for each of said last means, having driving and driven elements, the driven element of each said reversing gear mechanism being connected in driving relation to one of said last means, a change speed gearing having driving and driven elements, the driven element of said change speed gearing being connected in driving relation to the driving elements of said reversing gear mechanisms, and power means for rotating the driving element of said change speed gearing.

2. In an earth working tool, in combination with a plurality of tool adjusting devices to be operated, means for operating such devices, reversing gear mechanism for each of said last means, having driving and driven elements, the driven element of each said reversing gear mechanism being connected in driving relation to one of said last means, a change speed gearing having driving and driven elements, the driven element of said change speed gearing being connected in driving relation to the driving elements of said reversing gear mechanisms, and power means for rotating the driving element of said change speed gearing, each of said gearing mechanisms being provided with a control handle and all said handles being positioned adjacent each other whereby to be in convenient reach of the operator.

3. In a self propelled earth working tool, steerable wheels, power plant, traction elements and operator's station, all connected by a suitable framework, together with controlling means for said steerable wheels and traction elements extending to said operator's station, in combination with one or more earth engaging elements each having one or more adjusting devices, rotary means for operating such devices, reversing gear mechanism for each of said last means, having driving and driven elements, the driven element of each said reversing gear mechanism being connected in driving relation to one of said last means, a change speed gearing having driving and driven elements, the driven element of said change speed gearing being connected in driving relation to the driving elements of said reversing gear mechanisms, and means driven from said power plant for rotating the driving element of said change speed gearing, said change speed gearing and each of said reversing gear mechanisms being provided with an operating handle and all said handles being located within easy reach of an operator at said operator's station.

4. In a self-propelled earth working tool, steerable wheels, power plant, traction elements and operator's station, all connected by a suitable framework, together with controlling means for said steerable wheels and traction elements extending to said operator's station, in combination with one or more earth engaging elements each having one or more adjusting devices, rotary means for operating such devices, reversing gear mechanism for each of said last means, having driving and driven elements, the driven element of each said reversing gear mechanism being connected in driving relation to one of said last means, a change speed gearing having driving and driven elements, the driven element of said change speed gearing being connected in driving relation to the driving elements of said reversing gear mechanisms, and means driven from said power plant for rotating the driving element of said change speed gearing, said change speed gearing and each of said reversing gear mechanisms being provided with an operating handle and all said handles being located within easy reach of an operator at said operator's station, the operating handles for said reversing gear mechanisms being arranged in a compact group and the operating handle for said change speed gearing being set apart from said group.

5. In a self-propelled earth working tool having steerable wheels, power plant, transmission, traction elements and operator's station, all connected by a suitable framework, together with controlling means for said steerable wheels and said transmission extending to said operator's station, in combination with one or more earth engaging elements, each having one or more adjusting devices, means for operating such devices, reversing gear mechanism for each of said last means, having driving and driven elements, the driven element of each of said reversing gear mechanism being connected in driving relation to one of said last means, a change speed gearing having driving and driven elements, the driven element of said change speed gearing being connected in driving relation to the driving elements of said reversing gear mechanisms, and means driven from said power plant for rotating the driving element of said change speed gearing, said power means comprising mechanism connected with said power plant in advance of said transmission whereby to be driven independently thereof.

6. A power transmission device comprising, in combination, a drive shaft, spaced drive shaft gears of different diameters loosely carried thereby and rotatable thereon, means for selectively engaging said drive shaft with either of said drive shaft gears, a driven shaft spaced from said drive shaft, spaced driven shaft gears fixed on said driven shaft and meshing with said first mentioned spaced gears, respectively, means connecting each of said driven shaft gears in driving relation to a series of intermeshing reversing gears for rotation of the corresponding gears of each series in opposite directions, corresponding gears of said series being arranged in coaxial pairs, a power output shaft for each pair of gears, said gears of each pair being journaled on their corresponding shafts for rotation, with respect thereto, and means associated with each pair of reversing gears for selectively engaging either gear of that pair with its power output shaft.

NEIL E. JERSEY.